No. 724,505. PATENTED APR. 7, 1903.
E. RIEMENSCHNEIDER.
HARROW.
APPLICATION FILED JULY 31, 1902.
NO MODEL.
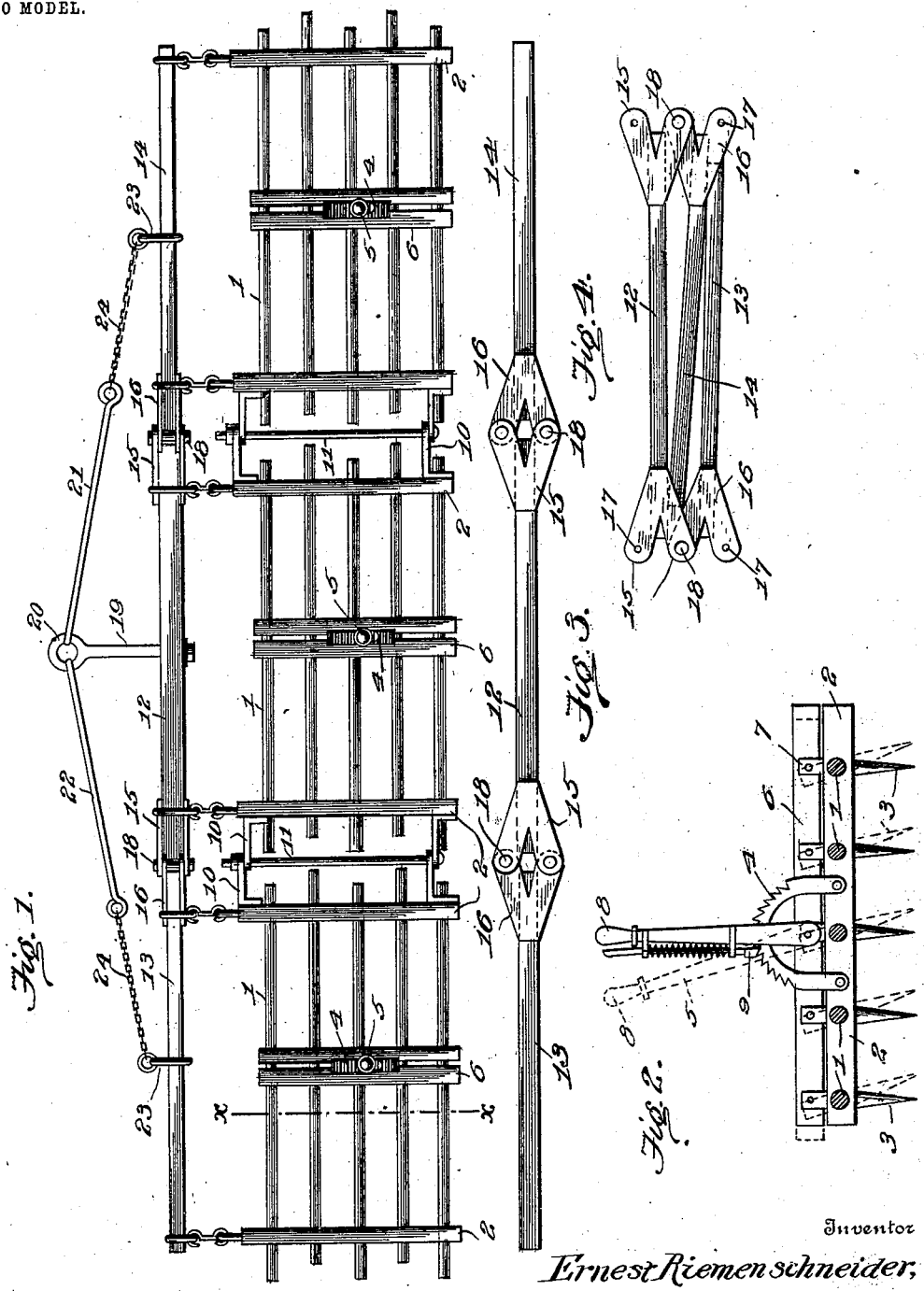
Inventor
Ernest Riemenschneider,
Witnesses

UNITED STATES PATENT OFFICE.

ERNEST RIEMENSCHNEIDER, OF STATE CENTER, IOWA.

HARROW.

SPECIFICATION forming part of Letters Patent No. 724,505, dated April 7, 1903.

Application filed July 31, 1902. Serial No. 117,858. (No model.)

*To all whom it may concern:*

Be it known that I, ERNEST RIEMENSCHNEIDER, a citizen of the United States, residing at State Center, in the county of Marshall and State of Iowa, have invented certain new and useful Improvements in Harrows; and I do hereby declare the following to be a full, clear, and exact description of the invention, such as will enable others skilled in the art to which it appertains to make and use the same.

My invention relates to certain new and useful improvements in folding harrows or cultivators and eveners therefor; and it consists of certain novel features of combination and construction of parts, the preferred form whereof will be hereinafter clearly set forth, reference being had to the accompanying drawings, which are made a part of this application.

The object of my invention is to provide a simple form of appliance of the character above specified which may be compactly folded, and thus readily drawn or removed from field to field or place to place as may be required.

Other objects and advantages will be hereinafter made clearly apparent.

In the drawings, Figure 1 is a top plan view of my invention complete, showing my folding harrow extended and the evener also extended. Fig. 2 is a detail showing a transverse section of the harrow proper, taken on line $x$ $x$ and looking toward the middle of the harrow. Fig. 3 shows my improved folding evener extended, while Fig. 4 shows my improved evener in a folded condition.

In order to conveniently refer to the various details of my invention and the parts required to coöperate therewith, numerals will be employed, of which 1 indicates the teeth-carrying members of my improved harrow, said teeth-carrying members being rotatably secured in position in suitable apertures provided in the frame-sections 2, each of said members 1 being provided with a plurality of teeth 3 for pulverizing the soil. It becomes desirable to control the position of the series of teeth 3, whereby they may be held in a vertical plane or inclined as may be desired from time to time, and with this object in view I attach to the frame-sections 2 the rack-bar 4, as clearly shown in Fig. 2, said rack-bar being designed to coöperate with the controlling-lever 5, which is pivotally connected to the auxiliary or controlling bar 6.

The controlling-bar 6 is pivotally connected to the ears or lugs 7, the lower ends of which are rigidly attached to the members 1, and it is therefore obvious that by swinging the controlling-lever forward, as indicated by the dotted lines 8 in Fig. 2, the teeth may be all simultaneously and easily inclined in the desired position, a suitable detent 9 being provided to coöperate with the controlling-lever 5 to hold said lever in an adjusted position.

Each of the harrow-sections (there being three of them in number, as shown in Fig. 1) is provided upon that end contiguous to the end of the adjacent section with the outwardly-extending arms or brackets 10, designed to overlap each other, so that the connecting-rod 11 may be extended through suitable apertures provided in said brackets, whereby the harrow-sections may be held pivotally united together, and thus enable the two outer sections to be folded inward upon each other. It is desirable that each of the said harrow-sections shall be provided with the controlling-lever 5, whereby the inclination of the teeth may be controlled. I also provide an evener designed to coöperate with my folding-harrow sections, consisting of the middle section 12 and the outer sections 13 and 14. Each end of the middle section 12 is provided with a bifurcated terminal consisting of the branches 15, while the inner end of each of the outer sections 13 and 14 is also bifurcated, so as to provide the branches 16, and it is therefore obvious that as all of the branches 15 and 16 are provided with registering apertures 17 a pin 18 may be introduced therethrough and reliably secure said branches together or enable them to be readily disengaged, as desired. By thus providing the form of construction presented in Figs. 3 and 4 the free ends of the branches or members 13 and 14 may be folded inward upon each other, the said branches 13 and 14 overlapping each other when so folded, as more fully shown in Fig. 4.

When the members 12, 13, and 14 are extended and the pins 18 properly introduced into the apertures 17, a rigid and strong evener or draft-equalizer is provided, thus enabling said evener to be very quickly folded when not required for use. The middle section 12 is also provided with the draft-engaging member 19, the outer end of which is provided with the ring 20, by which the animals may be readily secured in engagement therewith. The member 19 is properly reinforced by the stay-rods 21 and 22, each being connected at its outer end with an outer member of the evener, as by means of the clevis 23 or the equivalent thereof. The stay-rods 21 may be adapted to extend directly in engagement with the clevis 23, or an intervening flexible chain-section 24 may be provided, if deemed preferable.

Having thus fully described the construction and combination of parts deemed necessary in providing my improved folding harrow and believing that the advantages and manner of using the same will be made fully apparent from the foregoing specification, considered in connection with the accompanying drawings, further reference to the details is deemed unnecessary.

What I claim as new, and desire to secure by Letters Patent, is—

1. The herein-described folding harrow, comprising a plurality of teeth-carrying members; a frame adapted to rotatably receive said teeth-carrying members; and an evener adapted to coöperate with the harrow-sections and consisting of the members 12, 13 and 14, each being provided at their meeting ends with bifurcated terminals each branch designed to overlap the contiguous branch of the other member and having a pin to secure said branches together, all combined substantially as specified and for the purpose set forth.

2. The combination with folding-harrow sections, of an evener constructed to coöperate with said harrow-sections and comprising a central member and outer members, each provided at their meeting ends with branched terminals overlapping each other at their contiguous branches and removable means for connecting said branches in registering apertures therein, and a draft-engaging member on the middle section and connected with said outer sections, all substantially as shown and described.

In testimony whereof I affix my signature in presence of two witnesses.

ERNEST RIEMENSCHNEIDER.

Witnesses:
LOUIS SMITH,
J. B. MATSON.